United States Patent [19]

Aspden

[11] Patent Number: 5,151,577
[45] Date of Patent: Sep. 29, 1992

[54] ELECTRIC SURFACE HEATING AND APPARATUS THEREFOR

[76] Inventor: Harold Aspden, Acres High, Hadrian Way, Chilworth, Southampton, SO1 7HZ, England

[21] Appl. No.: 640,833

[22] Filed: Jan. 14, 1991

[30] Foreign Application Priority Data

Feb. 7, 1990 [GB] United Kingdom ............... 9002718

[51] Int. Cl.$^5$ ............................................. H05B 3/34
[52] U.S. Cl. ..................................... 219/528; 219/212
[58] Field of Search ............... 219/211, 212, 528, 529, 219/549; 363/146

[56] References Cited

U.S. PATENT DOCUMENTS

| | | | |
|---|---|---|---|
| 3,255,399 | 6/1966 | Parks | 363/146 |
| 3,683,151 | 8/1972 | Mills | 219/212 |
| 5,036,177 | 7/1991 | Pagliarini | 219/212 |

FOREIGN PATENT DOCUMENTS 2148633  5/1985  United Kingdom ............... 219/212

Primary Examiner—Teresa J. Walberg

[57] ABSTRACT

The harmful effects which build up in the bloodstream and in body fluids owing to cyclotron resonance caused by mains-powered heating appliances such as electric blankets are reduced by powering the appliance through a single-phase full-wave rectifier which converts 60 Hz ac into heating power that is 81% dc and 18% ac at 120 Hz. The rectifier can be incorporated in the blanket or within the housing of a switch, plug or power socket.

4 Claims, 2 Drawing Sheets

ELECTRIC SURFACE HEATING AND APPARATUS THEREFOR

FIELD OF INVENTION

This invention relates primarily to the power control of electric blankets but has relevance also to other forms of surface heating, such as underfloor heating, in which spaced-apart single conductor wires carry electric currents with the object of heating a surface in near proximity with the human body.

The subject of the invention is the apparatus essential to alternative implementations of the invention, in that the essential component can form part of the main body of the heating apparatus or be incorporated in the power supply circuit feeding the heating apparatus.

It is now established that field effects produced by electricity can be harmful in a domestic environment and particularly for close contact as with an electric blanket. The evidence points to substantially enhanced incidence of cancer and leukaemia and the effects are also evidenced where people live or work close to high voltage, high current power distribution lines.

The invention addresses this problem in a simple but novel way, based on a scientific appreciation of the likely causal basis of the health hazard.

BACKGROUND OF THE INVENTION

As will be described below, in some detail, in order to show that this invention is not a trivial conception, the health problem arises from a kind of cyclotron resonance. This is set up in the blood stream and in our body fluids, under the influence of weak electromagnetic fields at power supply frequency, owing to the combined action of the Earth's magnetic field of some 50 microtesla and, in the applicant's opinion, the thermally activated motion of hydrodium and hydroxyl ions, which are predominant in water but also present in our blood cells.

These ions have molecular masses which combine collectively in reacting to oppose the geomagnetic field and it just so happens that the ratio of the respective reactions of these ions can adjust to screen the influence of the geomagnetic field intensity in a way which results in a prefectly tuned resonant condition, provided that power frequency is within the range 40 to 67 Hz in a 50 microtesla geomagnetic field. The hydrodium ion has a molecular mass of 19 atomic mass units, corresponding to a 40 to 60 Hz cyclotron resonance, whereas the hydroxyl ion has a molecular mass of 17 atomic mass units, implying a 45 to 67 Hz cyclotron resonance. The range in each case is caused by the influence of the field screening effects of the other ion form and the range overlap represents the critical frequency range which can cause the build-up of ion activity leading to the health risk.

Essentially, therefore, the background to this invention concerns the need in U.S.A. to avoid proximity with electric currents or voltage fields at the 60 Hz power frequency. Similarly, in U.K, for example, the risks are the same notwithstanding their 50 Hz power frequency, because both frequencies lie in the danger range.

The electric blanket typifies a situation where the danger elements combine. Firstly, there is the close proximity of the human body to the heating surface. Secondly, there are significant electric currents adequate to sustain the power needed for adequate heating. Thirdly, the conductors are well spaced to keep the forward and reverse flows or voltage polarities apart, so avoiding risk of fire or flashover, but meaning a non-cancellation of the stray electromagnetic fields.

The remedy on the basis of cyclotron resonance is to use dc current to power an electric blanket, but that is something that is not an obvious practical consideration, because it adds circuit components to convert ac into dc and that is not seen as necessary since both are equally effective in producing heat. One may assume, however, that dc has been used to power an electric blanket, where electric storage batteries are relied upon or where domestic power is dc in form.

The invention is solely concerned with heating of blankets and surface heating generally, using apparatus powered by a single-phase ac supply. The heating element has two terminal connections. It is, for example, known to power a surface heating system having two such terminals, relying on a three-phase supply. In this case a three-phase rectifier bridge network is needed to translate the power input into a form that can be connected to the two-terminal heating system. This is disclosed in FIG. 6 of the Orosy and Matlen U.S. patent Ser. No. 3,789,190.

It is obvious to experts in electrical engineering that, given a two-terminal device which is solely intended to be fed by electric current for ohmic resistance heating purposes, the current can be of ac or dc form. The obvious connection is a direct use of unrectified ac if the supply is single-phase, meaning two supply lines. To adapt to a three-phase supply which loads each phase equally, the obvious action is to use a three-phase bridge rectifier configuration as shown in the above referenced U.S. patent, expressly to provide the two supply lines for connection to the two-terminal heating device.

It is not at all obvious to take the unnecessary step of rectifying single-phase ac for such a purpose. Even recognizing that harmful electromagnetic effects do arise from the power frequency excitation of electric blankets, the logical solution would seem to be to use smoothed dc so as to avoid any frequency resonance. The problem with this, apart from the added expense of the circuit components needed to exclude ac current, is that inductive chokes imply other hazards. The switching of power through an inductance can itself give rise to a fire risk which needs addressing by suitable switch design.

Moreover, the research on the health hazard problem posed by electric blankets leaves open in many minds the issue of which frequencies are harmful. It is here that the unpublished research of the applicant has revealed that the hazard range is confined to a frequency range centered on the power frequencies conventionally used in U.S.A. and U.K. The three-phase full-wave bridge-rectified current suggested as the heating power in U.S. Pat. No. 3,789,190 will eliminate the 60 Hz frequency and feed power instead by a mixture of dc and ac components at multiples of 180 Hz. Such a system will achieve for three-phase applications what the applicant is suggesting by this invention for single-phase applications. However, that three-phase advantage is fortuitous, inasmuch as the teachings involved do not suggest the specific health hazard avoidance which is this applicant's objective. For the single-phase application, a necessary condition for most domestic situations, it is necessary to take note of what is here disclosed as the invention by reference to novel structure in rectifying without smoothing the single-phase ac fed into the ohmic resistance of a heating element which has widely spaced compessating current carriers. These have the form of non-convoluted lengths of resistance wire embedded in the fabric of an electric blanket or set in concrete in an underfloor heating system. In contrast with normal electrical flex in which the go and return current paths are intertwined in the convolutions of the wire and so produce cancelling external electromagnetic field effects, the fields set up by two widely spaced conductors carrying currents in opposite directions can augment one another over a range commensurate with that spacing. When lying on an electric blanket or standing on a floor having underfloor heating, parts of the human body are subjected to the full field effects, because the spacings between those conductors are measured in inches.

The prior art disclosures also include circuit arrangements useful in heating electric blankets and containing thyristors or silicon controlled rectifiers to power the system using single-phase ac. Here it must be emphasized that a rectifier which operates under control to interrupt an ac supply as a function of threshold levels of a recurrent voltage waveform will generate ac components having the same frequency as the supply, plus components at integer multiples of that frequency. The 60 Hz or 50 Hz component of a mains power supply will not normally be eliminated by the use of thyristors or silicon controlled rectifiers controlling the power fed to a heating element. It is only if the single-phase voltage supply is full-wave rectified that the alternating current components translate into double frequency components and that there is complete exclusion of the source frequency.

Therefore, disclosures such as that shown in FIG. 3 of Endo, Shinoda and Kimata U.S. Pat. No. 4,658,119, where an electric blanket is supplied through a thyristor, are not relevant in anticipating the invention to be described.

BRIEF STATEMENT OF THE INVENTION

According to the invention, electric single-phase alternating current surface heating apparatus comprises, in combination, a heating element formed by lengths of wire conductor which collectively form a series circuit and which are spaced from adjacent wire lengths so as to distribute their heating effect over a surface to be heated, and a single-phase full-wave bridge rectifier circuit component having input connections for the supply of single-phase alternating current and output connections to the heating element for the supply of unsmoothed full-wave rectified current, whereby ohmic resistance heating of the heating element is powered primarily by a direct current component, but also by alternating current components at frequencies which are even multiples of the frequency of the single-phase alternating current supplied to the apparatus.

According to another aspect of the invention, an electric blanket switch for use on an electric blanket powered by single-phase alternating current and adapted to be connected in circuit in a flexible cable supplying power to an electric blanket and hand-held when operated, is characterized in that a single-phase full-wave bridge rectifier circuit component is incorporated within the switch housing and connected in circuit in series with the switch and on its output side, whereby ohmic resistance heating of the blanket is powered primarily by a direct current component, but also by alternating current components at frequencies which are even multiples of the frequency of the single-phase alternating current supplied to the apparatus.

The invention further extends to a circuit arrangement in which the apparatus has two heating elements which share the heating current in a way which applies typically to an underfloor heating situation in an industrial environment, to avoid certain steady state conditions. There can be dc field effects set up which augment the Earth's magnetic field and interact with ac fields radiated by electrical equipment operating at the mains power supply frequency. By having two separate heating elements and causing the heating current to switch cyclically between the elements the steady excitation conditions that are conducive to cyclotron resonance can be avoided.

It is therefore in accordance with other features of this invention to incorporate a dual heating element structure in combination with a power supply circuit including a full-wave rectifier having no provision for current smoothing. According to this aspect of the invention, the apparatus comprises two heating elements connected in parallel and powered from a common single-phase alternating current supply which feeds current for both elements through a common single-phase full-wave rectifier circuit component, the circuits of the two heating elements being interconnected to form a bistable system operable to carry current through either of the elements as a function of temperature, the circuit being characterized by there being (a) no reactive components providing current smoothing, whereby the voltage applied across the heating elements is periodically zero-valued and the heating power input fluctuates at twice the power supply frequency, (b) electronically controlled switches in circuit with each of the heating elements, connected to be subject to the control of electric potentials at points of interconnection by cross-connections linking the circuits of the two heating elements, (c) different resistor segments of each of the heating elements comprising materials of different thermal resistance characteristics, whereby the relative electric potentials of the points of interconnection become a function of temperature, the circuit arrangement thereby assuring that both electronically controlled switches are non-conductive at times when the supply voltage is zero-valued and causing the bistable system to be reset at a frequency that is twice the supply frequency but allowing it, when energized, to adopt a state which is a function of temperature.

DETAILED DESCRIPTION OF THE INVENTION

Figure 1:
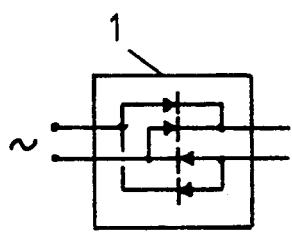
FIG. 1 shows a conventional single-phase full-wave bridge rectifier circuit component.
Figure 2:
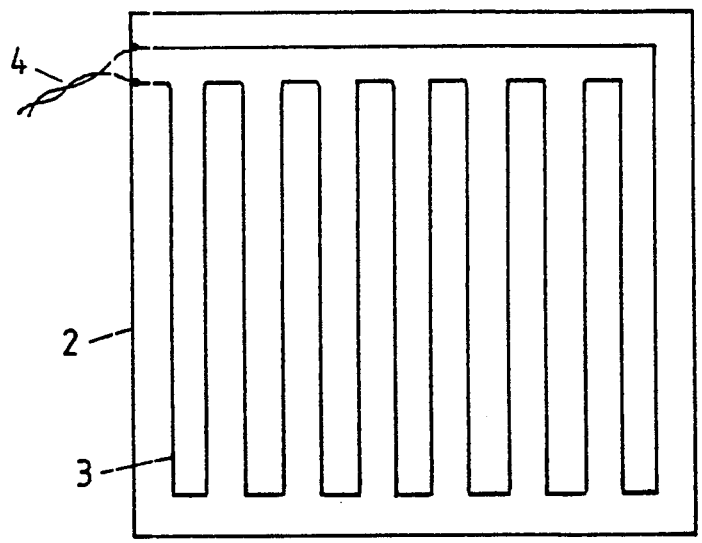
FIG. 2 shows the circuit layout of a heating element such as might apply to underfloor heating or an electric blanket.
Figure 3:
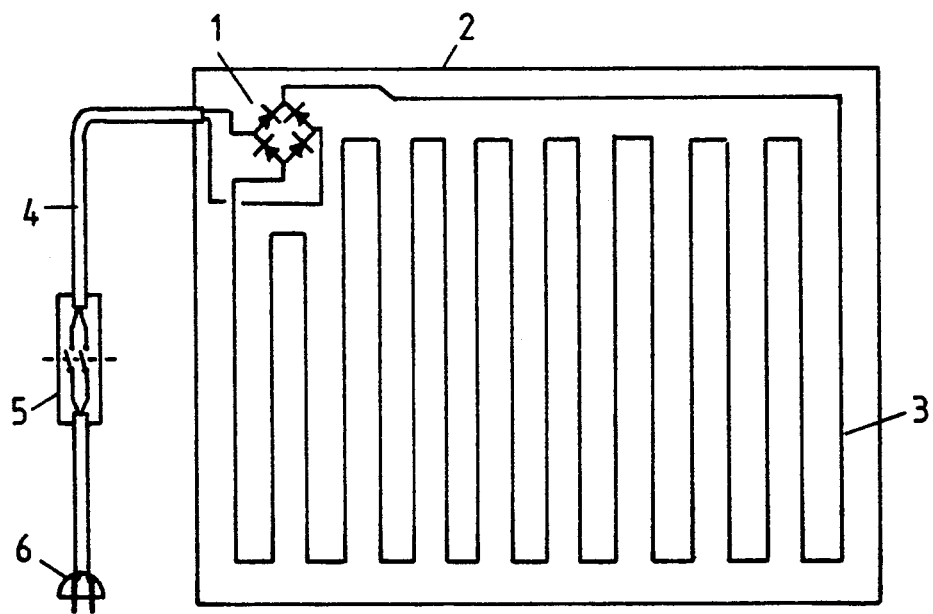
FIG. 3 shows the combination of the FIG. 1 component in an electric blanket.

In FIG. 1 a conventional semiconductor single-phase full-wave bridge rectifier circuit component 1 is shown. In FIG. 2 an electric blanket 2 incorporates a heating element in the form of a conductor of resistor wire sewn into the blanket so as to form lengths of conductor disposed in spaced-apart parallel relationship, but series-connected to provide a uniform distribution of heat over the surface of the blanket. The power heating the blanket is supplied by a flexible cable 4 connected through a power supply via an electrical switch (not shown). FIG. 3 shows the rectifier component 1 of FIG. 1 sewn into the blanket to provide a connection between the cable 4 and the heating element 3. The cable includes a hand-held switch 5 and is attached to a power plug 6.

In operation, this combination of blanket and single-phase full-wave bridge rectifier will supply to the blanket electrical power which is 81% dc and 18% ac at double the mains power supply frequency, the remaining 1% or so being at higher frequencies which are even multiples of the mains power supply frequency.

The object of this is to preclude the exposure of users of the blanket to cyclotron resonance effects induced at the frequency of the standard mains power supply, whilst avoiding the switching and current smoothing complications of circuits which aim at pure dc operation.

The technology of the invention, which concerns the combination of the rectifier 1 and the heating element, can, however, be implementated by any circuit arrangements which interpose the rectifier between the power supply and the heating element.

Figure 4:
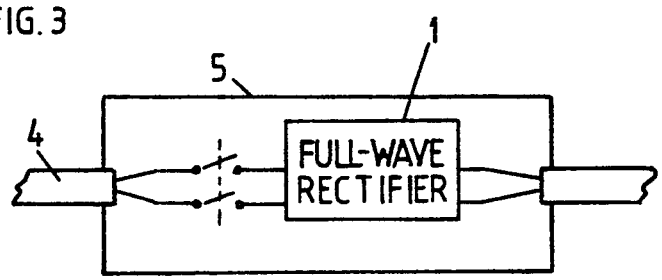
FIG. 4 shows an alternative implementation of the invention by which the component of FIG. 1 is built into an electric blanket switch.

Therefore, the conventional hand-held switch, used in the flexible cable supplying a blanket of the form shown in FIG. 2, could incorporate in its housing the rectifier component 1 connected on its output side. This is shown in FIG. 4. The hand-held switch incorporating the rectifier component 1 is a preferred embodiment of this invention as applied to an electric blanket having a simple heating element circuit such as is shown in FIG. 1. Although the rectifier component 1 may be sewn into the blanket, as shown in FIG. 3, the housing of switch 5 provides a convenient and secure assembly location.

What has been described is the simplest possible remedy for avoiding the 60 Hz cyclotron resonance problems that can occur where mains-powered electric blankets are used in the United States of America. The lowest frequency that can exist alongside the 81% dc component is at the 18% power level and, in the magnetic field developed by the Earth, this can only produce cyclotron resonant response in molecules of very low mass commensurate with the threshold set by the atomic mass of lithium. Only atomic hydrogen and atomic helium have lower atomic mass.

Given, therefore, that cyclotron resonance is a prime cause of the recognized health hazards developed by electric blankets, this invention serves to eliminate what is believed to be the harmful frequency band. Besides this, the use of the single-phase full-wave rectifier circuit component, on its own without circuit provision for smoothing, avoids adding reactance to the power circuit and so reduces the possible hazard risk which otherwise arises from switching a reactive load.

The invention has been described in relation to a single two terminal heating element without consideration of temperature regulation. The advantages of the invention can be utilized in systems having temperature control, as will be obvious to those skilled in the art. However, there are aspects of the invention which extend in this direction and relate specifically to the mode of excitation used. In particular, the cyclic zero-voltage feature of the single-phase full-wave excitation allows silicon controlled rectifiers to be used as switches with a reset rate at twice the power supply frequency.

Figure 5:
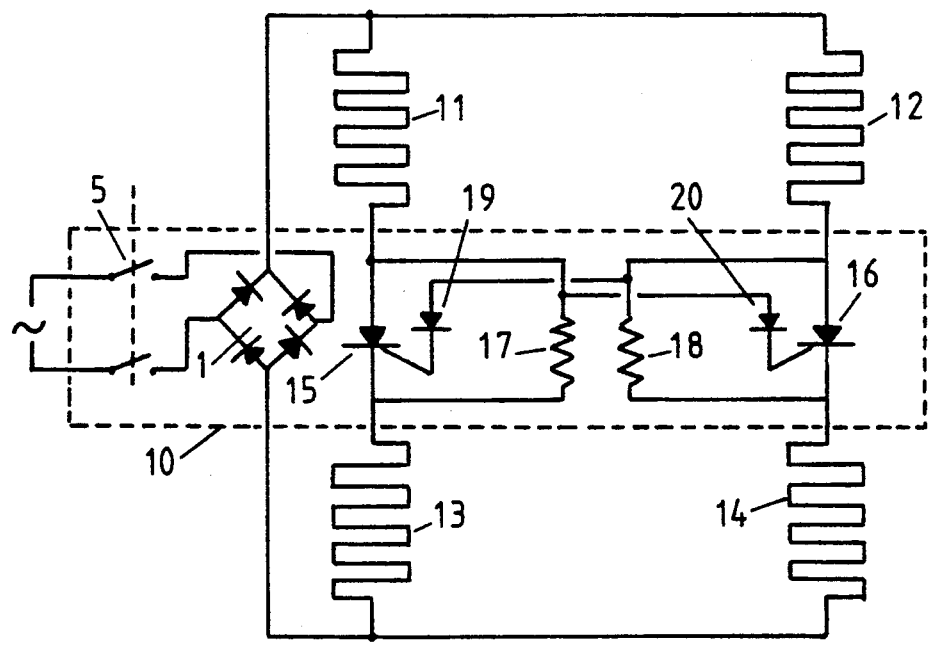
FIG. 5 heating apparatus in the form of a bridge network which operates in a bistable mode with heating current switching between two separate heating element circuits.
Figure 6:
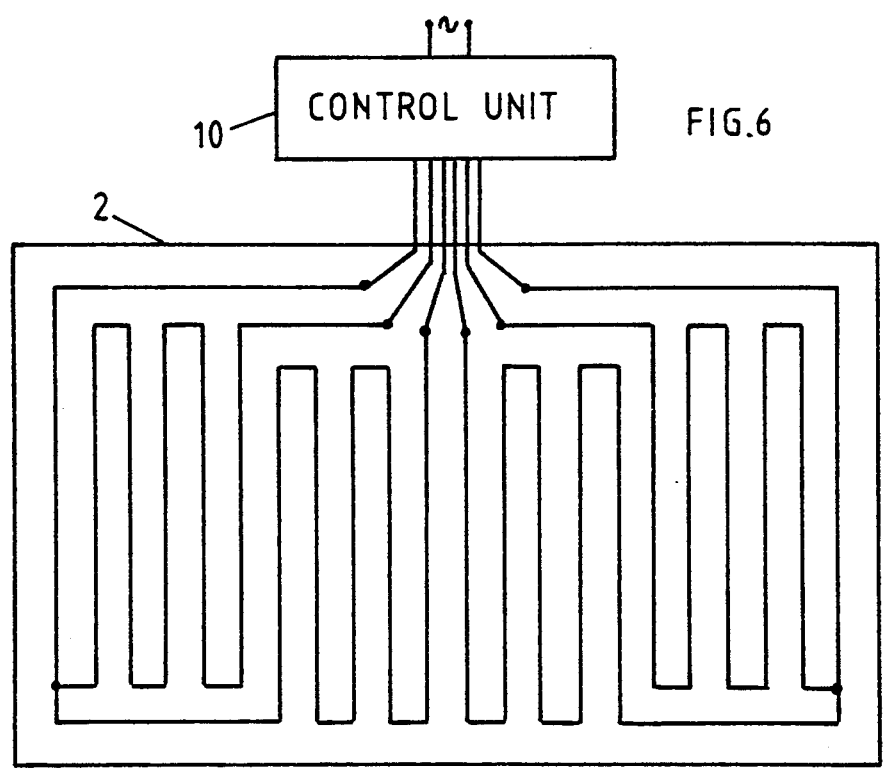
FIG. 6 shows how the heating apparatus of FIG. 7 can be organized to bring the electronic controls into a common unit.

To avoid steady state local field excitation conditions there is merit in switching the current between two heating elements in a bistable mode of operation regulated by the time constant set by the thermal heating cycle. This avoids local cyclotron resonance that can arise from spurious stray field effects from power equipment which interact with the dc field produced by the combined action of the Earth's magnetic field and the rectified dc component powering the heating apparatus. This will now be described by reference to FIG. 5 and 6. The latter figure merely portrays the circuit connections where the control circuit in the broken rectangle of FIG. 5 is transferred into a control unit 10. This unit may be a hand-held switch or could be a wall-mounted socket unit, or plug, as already suggested above.

Referring to FIG. 5, the apparatus shown comprises two heating elements each formed by two arms of a bridge network. The resistors 11, 12, 13 and 14 constitute the arms of the bridge network. Resistors 11 and 12 together form one heating element and resistors 13 and 14 form the other heating element.

Electronically controlled switches 15 and 16 regulate the current flow in these elements and are subject to the potentials set up at points of interconnection between the resistors 11 and 12 with the respective shunt resistors 17 and 18, which carry current by-passing the switches when these are non-conductive. The connecting conductor links include diodes 19 and 20 and form a bistable circuit configuration by their cross connection between the two heating elements.

Suppose first that the resistors 11, 12, 13 and 14 are all of equal value at a given operating temperature, but that resistors 13 and 14 have thermal characteristics whereby they increase in resistance with temperature more rapidly than do resistors 11 and 12.

In operation, when the power is switched on by closing switch 5 the full-wave rectified power is fed as input to the bridge network. The switches 15 and 16 begin from an open reset state, the zero-voltage condition. Thus current flow is limited by the shunt resistors 17 and 18. These have values which permit the potential on the positive side of switches 15 and 16 to become high enough during the excitation cycle to drive one or other of the switches 15 or 16 into a conductive state. As soon as this happens the side of the bridge network that has become conductive suffers a drop in potential at the positive interconnection of the switch and this prevents the other switch from becoming conductive.

Current therefore flows in one or other of the two heating elements. Whichever carries the current, its resistor 13 or 14 will heat up to a threshold level at which the potential of its point of interconnection controlling the switch in the other part of the network rises enough to trigger that other switch into the conductive state. This drops the potential fed across to the switch already carrying current and so that is held switched off after the next reset. The thermal switching cycle can take thousands of cycles at the mains power supply frequency.

Eventually, the substituted current carrying part of the network itself gets hot and its resistor 13 or 14 will heat sufficiently to upset the balance again, rediverting current flow back to the first condition.

In this way the apparatus operates continuously with its current changing in each circuit to match the progressive change of resistance with temperature and switching periodically. This action helps to avoid any spurious cyclotron resonance effects that might otherwise build up in body fluids of persons exposed to the stray field conditions.

I claim:

1. Electric single-phase alternating current surface heating apparatus comprising, in combination, two heating elements formed by lengths of wire conductor which are spaced from adjacent wire lengths so as to distribute their heating effect over a surface to be heated, and a single-phase full-wave bridge rectifier circuit component having input connections for the supply of single-phase alternating current and output connections to the heating elements for the supply of unsmoothed full-wave rectified current, whereby ohmic resistance heating of the heating elements is powered primarily by a direct current component, but also by alternating current components at frequencies which are even multiples of the frequency of the single-phase alternating current supplied to the apparatus, said heating elements being connected in parallel so as to be powered from a common single-phase alternating current supply which feeds current for both elements through the common single-phase full-wave rectifier circuit component, the circuits of the two heating element being interconnected to form a bistable system operable to carry current through either of the elements as a function of temperature, the circuit being characterized by there being (a) no reactive components providing current smoothing, whereby the voltage applied across the heating elements is periodically zero-valued and the heating power input fluctuates at twice the power supply frequency, (b) electronically controlled switches in circuit with each of the heating elements, connected to by subject to the control of electric potentials at points of interconnection by cross-connections linking the circuits of the two heating elements, (c) different resistor segments of each of the heating elements comprising materials of different thermal resistance characteristics, whereby the relative electric potentials of the points of interconnection become a function of temperature, the circuit arrangement thereby assuring that both electronically controlled switches are non-conductive at times when the supply voltage is zero-valued and causing the bistable system to be reset at a frequency that is twice the supply frequency but allowing it, when energized, to adopt a state which is a function of temperature.

2. Apparatus according to claim 1, in which each heating element comprises two separate resistor segments separated by an electronically controlled switch, and the four such resistor segments are connected as four arms of a bridge network, with the single-phase full-wave bridge rectifier circuit component connected to supply power to the bridge network and the electronically controlled switches, with the linking cross connections, serving to sense potential unbalance of the points of interconnections of the bridge network, the thermal resistance characteristics of the different arms of the bridge network being such that below a threshold temperature the current flow is diverted through the heating element governed by one electronically controlled switch and above that temperature the current flow is diverted through the heating element governed by the other electronically controlled switch.

3. Apparatus according to claim 2, wherein the overall resistivity of one heating element is the same as that of the overall resistivity of the other heating element and the relative thermal resistance characteristics of the different arms of the bridge network are arranged so that above a threshold temperature effective in either heating element the potential unbalance causes the heating current to be switched from that heating element to the other, the mean temperature of the apparatus being lower than that threshold temperature and being determined by the mean effect of heating current cylically switching between the two heating elements, but the switching action thereby serving to preclude the cyclotron resonance effects such as might occur from steady amplitude current excitation of either heating element.

4. An electric blanket switch connected in circuit in a flexible cable supplying single-phase alternating current power to an electric blanket, said power having a power supply frequency, the switch having a housing adapted to be hand-held when the switch is operated, and the circuit being characterized by having (a) a single-phase full-wave bridge rectifier circuit component incorporated within the switch housing, which component is permanently connected in circuit in series with the switch and on its output side, (b) there being no severable plug and socket connection between the switch and the blanket, (c) but there being wire connections directly linking two output junctions of the full-wave bridge rectifier to two ends of a heating resistor located in the blanket and (d) there being no reactive components in circuit providing current smoothing, whereby any smoothing of a rectified full-wave output of the rectifier circuit component is precluded and voltage applied across the heating resistor is periodically zero-valued as electrical current providing a heating power input fluctuates at twice the power supply frequency.

* * * * *